US012791301B2

(12) United States Patent
Yamauchi et al.

(10) Patent No.: US 12,791,301 B2
(45) Date of Patent: Nov. 10, 2026

(54) OPTICAL MEASUREMENT DEVICE

(71) Applicant: Mitsubishi Electric Corporation, Tokyo (JP)

(72) Inventors: Takanori Yamauchi, Tokyo (JP); Junya Nishioka, Tokyo (JP); Yukari Miyagi, Tokyo (JP); Hiroki Goto, Tokyo (JP); Yoshiaki Konishi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 308 days.

(21) Appl. No.: 18/441,421

(22) Filed: Feb. 14, 2024

(65) Prior Publication Data

US 2024/0183650 A1 Jun. 6, 2024

Related U.S. Application Data

(63) Continuation of application No. PCT/JP2021/031748, filed on Aug. 30, 2021.

(51) Int. Cl.
*G01B 11/02* (2006.01)
*G01B 9/02055* (2022.01)

(52) U.S. Cl.
CPC ....... *G01B 9/0207* (2013.01); *G01B 9/02075* (2013.01); *G01B 11/026* (2013.01); *G01B 2290/70* (2013.01)

(58) Field of Classification Search
CPC .. G01B 11/026; G01B 11/14; G01B 2290/70; G01B 9/02004; G01B 9/02028;
(Continued)

(56) References Cited

U.S. PATENT DOCUMENTS

2006/0279741 A1* 12/2006 Hirata ........................ G01J 4/04 356/491
2008/0043244 A1* 2/2008 Hatori ................ G01B 9/02004 356/477

(Continued)

FOREIGN PATENT DOCUMENTS

JP 10-339604 A 12/1998
JP 2009-244207 A 10/2009

(Continued)

OTHER PUBLICATIONS

International Search Report (PCT/ISA/210) Issued in PCT/JP2021/031748, dated Oct. 26, 2021.

(Continued)

*Primary Examiner* — Nathnael Aynalem
(74) *Attorney, Agent, or Firm* — Birch, Stewart, Kolasch & Birch, LLP

(57) ABSTRACT

An optical measurement device includes: a splitter to split light into measurement light and reference light; a switch interferometer to output first interference light obtained by causing two orthogonally polarized waves of the reference light to interfere with each other, second interference light obtained by causing two orthogonally polarized waves of reflected light from a target object of the measurement light to interfere with each other, and third interference light obtained by causing the reference light and the reflected light to interfere with each other; a photoelectric converter to convert the interference light into electric signals; a digital converter to perform A/D conversion on the electric signals; and a calculation processor to obtain an optical path-length difference between the two orthogonally polarized waves of each of the reference light and the reflected light, and an optical path-length difference between the reference light and the measurement light.

8 Claims, 7 Drawing Sheets

(58) Field of Classification Search
CPC .. G01B 9/02081; G01B 9/0209; G01B 11/00; G01B 9/0207; G01B 9/02075; G01S 17/32; G01S 17/34; G01S 7/493; G01S 7/497; G01S 7/499; G01N 21/17
See application file for complete search history.

(56) References Cited

U.S. PATENT DOCUMENTS

| | | | | |
|---|---|---|---|---|
| 2009/0244547 | A1 | 10/2009 | Ozawa | |
| 2017/0052091 | A1 | 2/2017 | Mori | |
| 2021/0011157 | A1 * | 1/2021 | Onohara | G01S 7/493 |
| 2021/0396880 | A1 | 12/2021 | Yamauchi et al. | |

FOREIGN PATENT DOCUMENTS

| | | | |
|---|---|---|---|
| JP | 2010-17466 | A | 1/2010 |
| JP | WO2020/202547 | A1 | 10/2020 |

OTHER PUBLICATIONS

Korean Office Action for Korean Application No. 10-2024-7005357, dated Apr. 26, 2024, with an English translation.
Chinese Office Action and Search Report for Chinese Application No. 202180100807.0, dated Apr. 24, 2026, with English translation of the Office Action.

* cited by examiner

OPTICAL MEASUREMENT DEVICE

CROSS REFERENCE TO RELATED APPLICATIONS

This application is a Continuation of PCT International Application No. PCT/JP2021/031748 filed on Aug. 30, 2021, which is hereby expressly incorporated by reference into the present application.

TECHNICAL FIELD

The present disclosure relates to an optical measurement technology.

BACKGROUND ART

There are optical distance measurement technologies using the interference phenomenon of light. According to the optical distance measurement technologies using the interference phenomenon of light, light emitted from a light source is split into reference light and measurement light, the reference light and reflected light which is light resulting from reflection of the measurement light on a target object are caused to interfere with each other, and the distance from the light source to the target object is measured on the basis of a condition under which the reference light and the reflected light intensify each other. Tomographs to which such optical distance measurement technologies are applied are known as optical coherence tomographs (OCT: Optical Coherence Tomography).

Examples of such optical distance measurement technologies include wavelength scanning interferometry and white light interferometry. In wavelength scanning interferometry, light emitted from a light source is wavelength-swept, and the wavelength-swept light is split into measurement light and reference light. The measurement light turns into reflected light after being reflected on a target object, and the reflected light and the reference light are caused to interfere with each other to generate interference light. The distance from the light source to the target object is measured by measuring the frequency of the interference light. Optical coherence tomographs to which wavelength scanning interferometry is applied are known as wavelength swept optical coherence tomographs (SS-OCT: Swept Source-OCT).

On the other hand, white light interferometry is also called spectral domain interferometry, and uses a white light source that emits light in a wide band. In white light interferometry, the light in the wide band emitted by the light source is split into measurement light and reference light. The measurement light turns into reflected light after being reflected on a target object, and the reflected light and the reference light are caused to interfere with each other to generate interference light. A light splitter spectrally splits the interference light spatially, and interference fringes generated on the basis of an interference condition are Fourier-transformed to measure the distance from the light source to the target object. Optical coherence tomographs to which white light interferometry is applied are known as spectral domain optical coherence tomographs (SD-OCT: Spectral Domain-OCT).

Both of these schemes use the phenomenon in which optical interference is sensed when an optical path-length difference between measurement light and reference light is in the range of the coherence length of their light source. The coherence length that determines the measurable range of one instance of measurement differs depending on the specifications of a light source, and is inversely proportional to the line width of the light source. That is, the narrower the line width is, the longer the coherence length is, and the wider the measurable range of one instance of measurement is. However, typically the narrower the line width of a light source is, the higher the cost of the light source is. Accordingly, a device is required for attaining a wider measurement range with a low-cost light source.

Patent Literature 1 discloses a technology to substantially expand the measurement range by providing a mechanism to adjust delays of reference light using a movable mirror, and repeating measurement while changing the optical path length of the reference light. The optical path length of the reference light is adjusted in such a manner that the optical path length of reflected light from a certain location in a measurement target at which location measurement is desired to be performed and the optical path length of the reference light become the same, and the reflected light and the reference light are combined. By approximately simultaneously controlling the optical path length of the reference light according to a measurement cycle, the practical measurable range is expanded with a low-cost light source having a short coherence length.

CITATION LIST

Patent Literature

Patent Literature 1: JP 2009-244207-A

SUMMARY OF INVENTION

Technical Problem

However, since the adjusted optical path length of the reference light changes depending on the ambient environmental temperature, the controlled optical path length of the reference light does not completely match a control value, but always fluctuates. Because of this, according to the technology of Patent Literature 1, there are discontinuous points between coherence lengths like patches, in some cases.

The present disclosure has been made to solve such problems, and an object thereof is to provide an optical measurement technology to enable distance measurement in which the influence of an optical path-length fluctuation due to the environmental temperature is reduced.

Solution to Problem

An optical measurement device according to an embodiment of the present disclosure includes: a splitter to split light emitted from a laser light source into measurement light and reference light; a switch interferometer to output first interference light obtained by causing two orthogonally polarized waves of the reference light to interfere with each other, second interference light obtained by causing two orthogonally polarized waves of reflected light from a target object of the measurement light to interfere with each other, and third interference light obtained by causing the reference light and the reflected light to interfere with each other, with orthogonally polarized states of each interference light separated from each other; a photoelectric converter to receive each interference light, and convert the received interference light into electric signals; a digital converter to perform A/D conversion on the electric signals, and output digital signals after the A/D conversion as reception signals; and a calculation processor to convert the reception signals into frequency spectrums, and obtain an optical path-length difference between the two orthogonally polarized waves of the reference light, an optical path-length difference between the two orthogonally polarized waves of the reflected light, and an optical path-length difference between the reference light and the measurement light.

Advantageous Effects of Invention

Optical measurement devices according to embodiments of the present disclosure enable distance measurement in which the influence of an optical path-length fluctuation due to the environmental temperature is reduced.

BRIEF DESCRIPTION OF DRAWINGS

FIG. 3A is a figure depicting a mode in a case where a temperature fluctuation of the reference light is measured.

FIG. 3B is a figure depicting a mode in a case where a temperature fluctuation of the reflected light is measured.

FIG. 3C is a figure depicting a mode in a case where measurement of the distance to the target object is performed according to a combined wave of corresponding polarized waves of the reference light and the measurement light.

DESCRIPTION OF EMBODIMENTS

Figure 1:
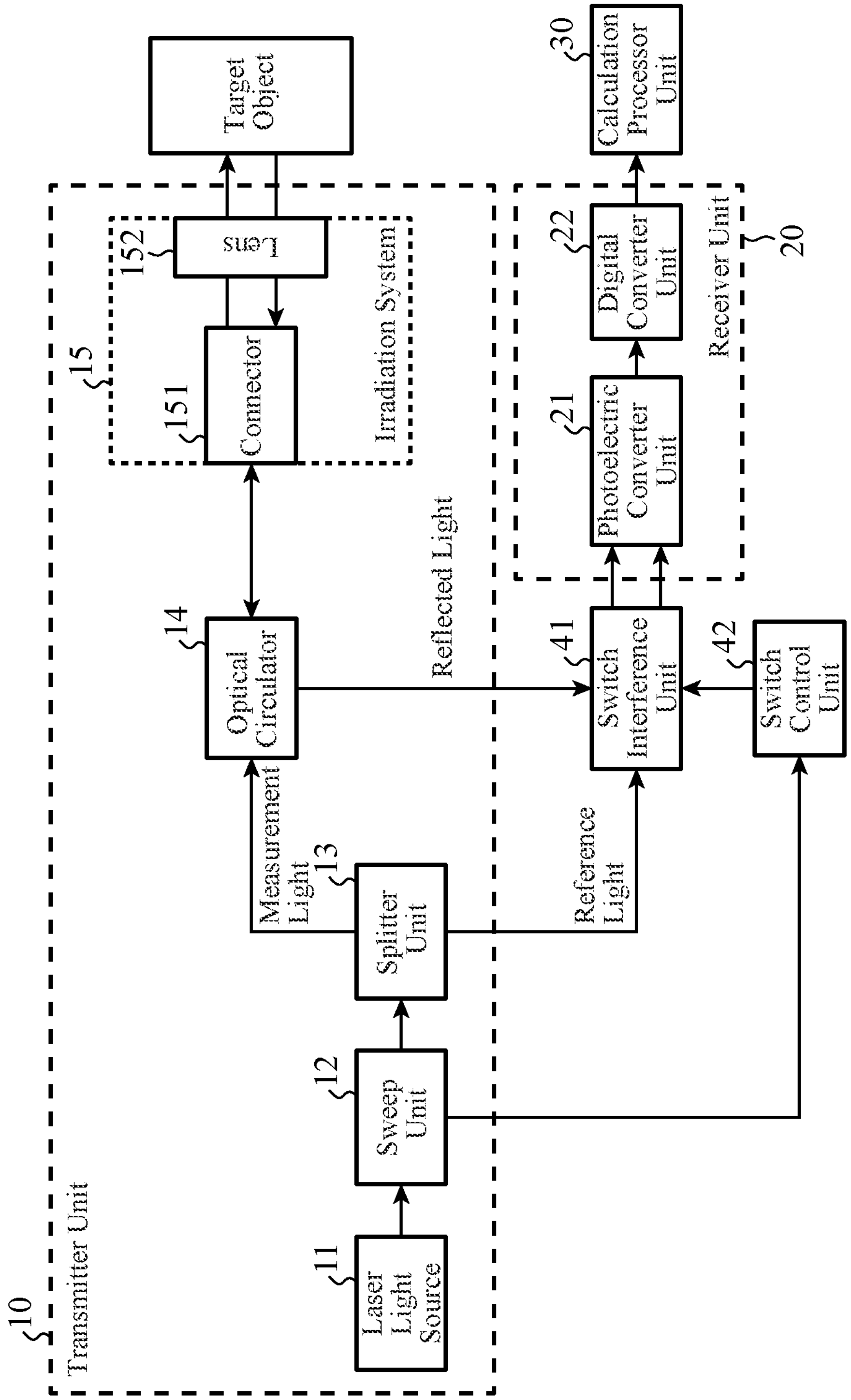
FIG. 1 is a block diagram depicting a configuration example of an optical measurement device according to a first embodiment.

Hereinbelow, various embodiments in the present disclosure are explained in detail with reference to the attached figures. Note that constituent elements that are given identical or similar reference characters in the figures have identical or similar configuration or functions, and repetitive explanations about such constituent elements are omitted.

First Embodiment

<Configuration>

An optical measurement device according to a first embodiment of the present disclosure is explained with reference to FIGS. 1 to 4. As depicted in FIG. 1, an optical measurement device according to the first embodiment includes a transmitter unit 10, a switch interference unit 41, a switch control unit 42, a receiver unit 20 and a calculation processor unit 30. The transmitter unit 10 includes a laser light source 11, a sweep unit 12, a splitter unit 13, an optical circulator 14 and an irradiation system 15. The receiver unit 20 includes a photoelectric converter unit 21 and a digital converter unit 22.

(Laser Light Source)

The laser light source 11 emits laser light which is continuous light. For example, the laser light source 11 is a semiconductor laser, and emits laser light with a predetermined frequency.

(Sweep Unit)

The sweep unit 12 wavelength-sweeps the laser light emitted by the laser light source 11. The sweep unit 12 outputs the wavelength-swept laser light as swept light. The swept light output by the sweep unit 12 is laser light with a continuous wave.

(Splitter Unit)

The splitter unit 13 is configured by using an optical coupler or the like, and splits input light at a predetermined power ratio. In the first embodiment, the splitter unit 13 splits the swept light output from the sweep unit at a predetermined power ratio, and outputs the split laser light as measurement light and reference light. The measurement light is guided to the optical circulator 14, and the reference light is guided to the switch interference unit 41.

(Optical Circulator)

For example, the optical circulator 14 is configured by using a 3-port optical circulator, and guides the measurement light to the irradiation system 15. In addition, the optical circulator 14 guides, to the switch interference unit 41, reflected light which is light resulting from reflection of the output measurement light on a target object.

(Irradiation System)

The irradiation system 15 irradiates the target object with the measurement light. For example, the irradiation system 15 is configured by using a connector 151 to connect an optical fiber, and lenses 152 such as one or more transparent lenses or one or more reflective lenses. The irradiation system 15 irradiates the target object with condensed measurement light resulting from collimation and condensing of the measurement light that the optical circulator 14 has guided to the irradiation system 15. Alternatively, without using the lens 152, the target object may be directly irradiated with the measurement light from the end of the connector 151. In addition, the irradiation system 15 guides the reflected light to the optical circulator 14.

(Switch Interference Unit; Switch Control Unit)

Figure 3A:
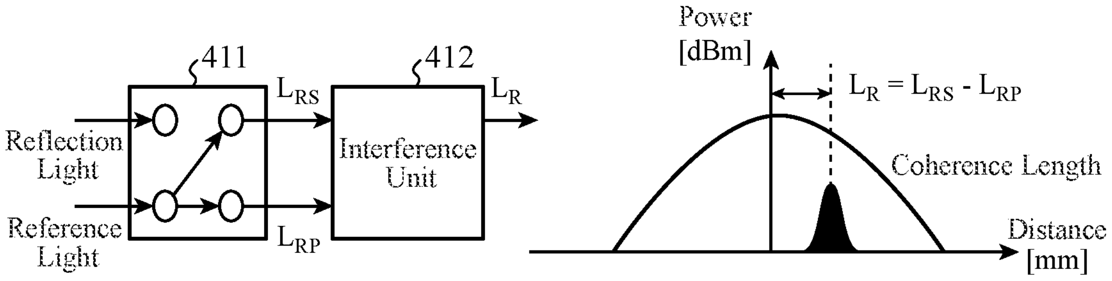
FIG. 3A is a figure for explaining a switching unit and an interference unit of the optical measurement device according to the first embodiment.
Figure 3B:
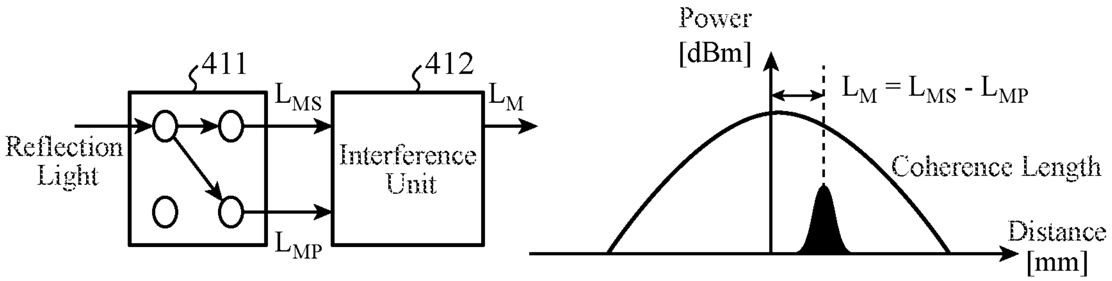
FIG. 3B is a figure for explaining the switching unit and the interference unit of the optical measurement device according to the first embodiment.
Figure 3C:
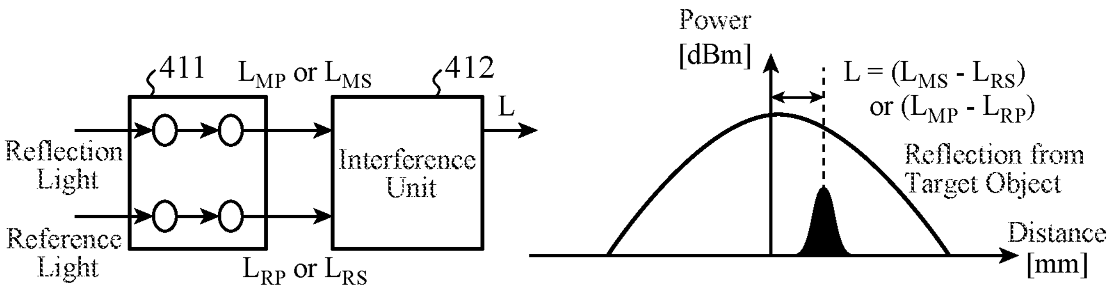
FIG. 3C is a figure for explaining the switching unit and the interference unit of the optical measurement device according to the first embodiment.

The reference light and the reflected light are input to the switch interference unit 41. The switch interference unit 41 outputs: first interference light obtained by causing two orthogonally polarized waves of the reference light to interfere with each other; second interference light obtained by causing two orthogonally polarized waves of the reflected light to interfere with each other; or third interference light obtained by causing the reference light and the reflected light to interfere with each other. In order to implement such a function, the switch interference unit 41 includes a switching unit 411 and an interference unit 412 as depicted in FIGS. 3A to 3C.

The switching unit 411 sequentially switches the optical path for any one of a pattern of the two orthogonally polarized waves of the reference light, a pattern of the two orthogonally polarized waves of the reflected light and a pattern of the reference light and the reflected light, and outputs the two polarized waves or the reference light and reflected light of any of the patterns to the interference unit 412. The switching of the optical path is performed by using an optical switch and a Variable Optical Attenuator (VOA) on the basis of signals from the switch control unit 42. Since the switching of the optical path is performed every time the sweep of the sweep unit 12 is performed, timings at which the path is switched by the switch control unit 42 are controlled by electric signals from the sweep unit 12. At this time, the switching frequency ratio may be uniform or may be not uniform among the patterns. For example, in a case where the intensity of the reflected light from the target object is low, the frequency ratio of switching to the path for the pattern of interference of the two orthogonally polarized waves of the reference light may be lowered adaptively depending on the intensity of the reflected light, in order to obtain the reflected light from the target object more.

For example, the interference unit 412 is configured by using a fiber coupler, and causes interference of input light. The interference unit 412 causes the two orthogonally polarized waves of the reference light to interfere with each other, causes the two orthogonally polarized waves of the reflected light to interfere with each other or causes the reference light and the reflected light with corresponding polarized waves to interfere with each other. In addition, the interference unit 412 outputs the interference light obtained by causing the two orthogonally polarized waves of the reference light or the two orthogonally polarized waves of the reflected light to interfere with each other, with orthogonally polarized states of each interference light separated from each other. In addition, the interference unit 412 outputs the interference light obtained by causing the reference light and the reflected light of the corresponding polarized waves to interfere with each other. By performing the switching of the path every time the sweep is performed, each interference light is obtained approximately simultaneously. A member that can separate two orthogonally polarized waves from each other is used for the interference unit 412. For example, two orthogonally polarized waves can be separated from each other by using an Intradyne Coherent Receiver (ICR) used for optical information communication. Further details of the switch interference unit 41 are mentioned later.

(Photoelectric Converter Unit)

The photoelectric converter unit 21 performs photoelectric conversion on the interference light output by the switch interference unit 41, and outputs analog signals representing the interference light.

(Digital Converter Unit)

The digital converter unit 22 performs A/D conversion on the analog signals, and outputs digital signals obtained after the A/D conversion as reception signals.

In the optical measurement device according to the first embodiment, the receiver unit is configured by using the photoelectric converter unit 21 and the digital converter unit 22. That is, the receiver unit receives the reference light and the reflected light which is light resulting from reflection of the measurement light on the target object, and outputs the reception signals representing the interference light.

(Calculation Processor Unit)

The calculation processor unit 30 outputs a measurement distance calculated from the frequency spectrums of the interference light on the basis of the reception signals. More specifically, for example, the calculation processor unit 30 measures the frequency spectrums of the interference light by performing the Fourier transform on the reception signals. The measurement distance is determined by the optical path-length difference between the measurement light and the reference light. The frequency obtained when the optical path-length difference between both lights from the splitter unit 13 is zero is zero, and the frequency increases in proportion to the optical path-length difference. By measuring the value, distance measurement of a measurement target is performed. At this time, distances for which the frequency spectrums can be obtained are restricted by the coherence length.

For example, optical fibers connect: the laser light source 11 and the sweep unit 12; the sweep unit 12 and the splitter unit 13; the splitter unit 13 and the switch interference unit 41; the switch interference unit 41 and the photoelectric converter unit 21; the splitter unit 13 and the optical circulator 14; the optical circulator 14 and the connector 151; and the optical circulator 14 and the switch interference unit 41, and the laser light is guided via the optical fibers. In particular, paths from the splitter unit 13 to the photoelectric converter unit 21 through which light is propagated are configured by using polarization maintaining fibers to maintain two orthogonally polarized states like polarization maintaining fibers. That is, the path between the splitter unit 13 and the switch interference unit 41, the path between the switch interference unit 41 and the photoelectric converter unit 21, the path between the splitter unit 13 and the optical circulator 14, the path between the optical circulator 14 and the connector 151 and the path between the optical circulator 14 and the switch interference unit 41 are configured by using polarization maintaining fibers.

The switch control unit 42 and the calculation processor unit 30 are entirely or partially implemented by a computer including a processor and a memory which are not depicted, for example. Those functional units are implemented by programs stored on the memory being read out and executed by the processor. The programs are implemented as software, firmware or a combination of software and firmware. For example, examples of the memory include: non-volatile or volatile semiconductor memories such as a Random Access Memory (RAM), a Read Only Memory (ROM), a flash memory, an Erasable Programmable Read Only Memory (EPROM) or an Electrically-EPROM (EEPROM), magnetic discs, flexible discs, optical discs, compact discs, mini discs or DVDs.

As another example, the switch control unit 42 and the calculation processor unit 30 may be entirely or partially implemented by a processing circuit which is not depicted, instead of a processor and a memory. In this case, for example, the processing circuit is a single circuit, a composite circuit, a programmed processor, a parallel-programmed processor, an Application Specific Integrated Circuit (ASIC), an Field-Programmable Gate Array (FPGA) or a combination of these elements.

Figure 2A:
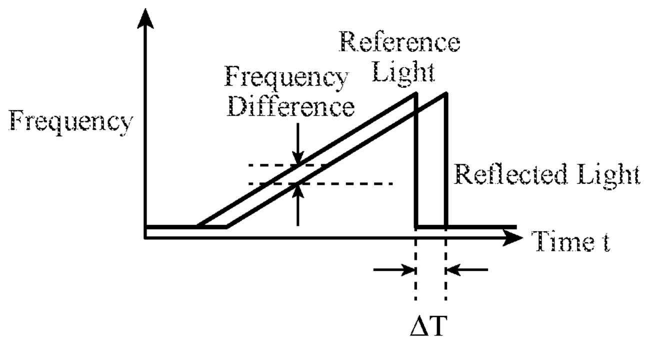
FIG. 2A is a figure depicting an example of the relationship between reference light and reflected light input to a switch interference unit in a case where the distance between a transmitter unit and a target object is a particular distance, according to the first embodiment.
Figure 2B:
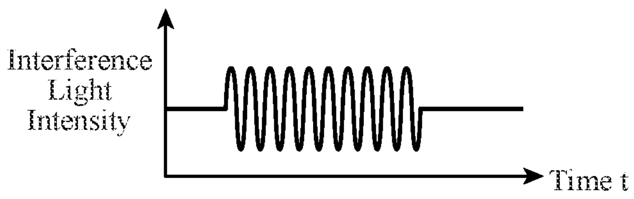
FIG. 2B is a figure depicting an example of the time waveform of interference light intensity obtained from the reference light and the reflected light depicted in FIG. 2A.
Figure 2C:
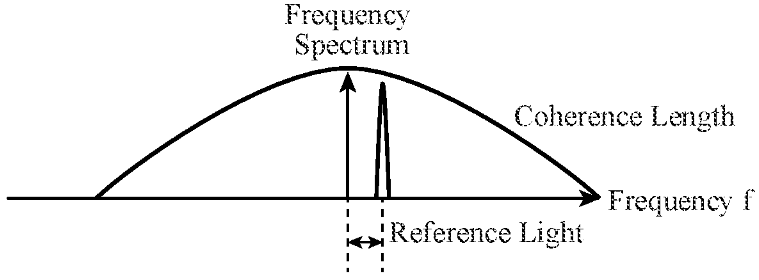
FIG. 2C is a figure depicting an example of a frequency spectrum output from a calculation processor unit on the basis of the time waveform of the interference light intensity at a time point.

Next, with reference to FIG. 2, a method by which the optical measurement device according to the first embodiment measures the position of a target object is explained. FIG. 2A depicts an example of the time-frequency relationship between reference light and reflected light, FIG. 2B depicts an example of an intensity graph of interference light in relation to time, and FIG. 2C depicts an example of the frequency spectrum after the Fourier transform has been performed on the interference light.

The reflected light is delayed relative to the reference light depending on the distance to the target object. Because of this, in FIG. 2A, the reflected light is depicted in a state where it is shifted to the right by time AT relative to the reference light. If the target object is far, the time AT increases, and the frequency difference also increases in proportion to time. Note that in a case where the path length of the reference light is set longer than the path length that the reflected light can have, the reference light is delayed relative to the reflected light.

FIG. 2B represents, in relation to time, the intensity signal of the interference light obtained by combining, at the interference unit 412, the reference light and the reflected light that are shifted by the time ΔT relative to each other.

The calculation processor unit 30 has a frequency measurement function, and the calculation processor unit 30 measures the intensity (frequency spectrum) of each frequency component of the interference light on the basis of the interference light. FIG. 2C is a figure depicting the frequency spectrum of the interference light measured by the frequency measuring unit on the basis of the interference light depicted in FIG. 2B. In FIG. 2C, the horizontal axis represents the frequency, and the vertical axis represents the intensity of the interference light. The intensity of the frequency spectrum lowers as the distance difference between the reference light and the reflected light increases. Here, the value of the distance difference when the intensity lowers by 3 dB from the maximum value (when the intensity becomes ½) is defined as the coherence length, and is represented by the following Formula (1).

$$l_c = \frac{c}{\Delta\nu}\frac{2\ln 2}{\pi} \tag{1}$$

In Formula (1), c represents the speed of light, and Δv represents the line width of the light source. As represented by Formula (1), the coherence length is inversely proportional to the line width of the light source. The coherence length of the laser light source is inversely proportional to the cost. The narrower the line width of the laser light source is, the higher the cost is. The coherence length of a low-cost laser light source is limited to several dozen millimeters or shorter.

Next, with reference to FIG. 3, a method of calibrating a temperature-dependent fluctuation according to the first embodiment is explained. FIG. 3A depicts the path of the switching unit 411 and a frequency spectrum example in a case where the optical path-length difference between two orthogonally polarized waves of reference light is measured. FIG. 3B depicts the switching unit 411 and a frequency spectrum example in a case where the optical path-length difference between two orthogonally polarized waves of reflected light is measured. FIG. 3C depicts the switching unit 411 and a frequency spectrum example in a case where the distance to a target object is measured from the optical path-length difference between the reference light and the reflected light. When the distance to the target object is measured, only one polarized state in the two orthogonally polarized states is used.

An optical path length is represented by the product of a refractive index and a length. A measurement method using an interference system in the present disclosure performs distance measurement by measuring the optical path-length difference between the two paths of the reference light and the reflected light. When optical fibers or the like are used as optical paths, the refractive indices and the glass lengths of materials are temperature-dependent. Accordingly, the optical path lengths change depending on changes of the environmental temperature. Its proportional coefficient is defined as a coefficient of linear expansion α.

When light is propagated through an optical path such as an optical fiber, an optical fiber core cross-section which is the propagation path does not have the shape of a perfect circle within a tolerance of variations that occur during manufacturing. Because of this, light is separated mainly into two orthogonally-polarized states (polarization modes) during the propagation. Because of this, a refractive index difference occurs between the two orthogonally polarized states, and accordingly the two polarized waves also have different optical path lengths. This refractive index difference is called birefringence. The birefringence of a typical optical fiber is distributed non-uniformly in the longitudinal direction, and the polarized states fluctuate in relation to time depending on stress load due to the temperature distribution or twisting. On the other hand, optical fibers having taken into consideration birefringence in their designs are called polarization maintaining fibers. These have designs in which the crosstalk between polarized states does not occur during transmission, by incorporating rods parallel to the core in the optical fiber longitudinal direction so as to maintain the polarized states. Because of this, birefringence in the longitudinal direction is uniform, and additionally the temperature dependence of birefringence also has a linear relationship. Its proportional coefficient is defined as γ.

In FIG. 3, the optical path lengths of the two orthogonally-polarized states of the reference light from the splitter unit 13 to the interference unit 412 are defined as $L_{RS}$ and $L_{RP}$. A temperature change amount (temperature difference) of the path of the reference light from a reference temperature is defined as $\Delta T_R$. The path length of the reference light at the reference temperature (e.g. 25° C.) that has been acquired in advance is defined as $L_{RO}$. Then, an optical path-length difference $\Delta L_R$ of the two orthogonally-polarized states is represented by the following Formula (2).

$$\begin{aligned}\Delta L_R &= L_{RS} - L_{RP} \\ &= \gamma \Delta T_R L_{RO}\end{aligned} \tag{2}$$

Modifying Formula (2) gives Formula (3) representing a correlation between the optical path-length difference $\Delta L_R$ and the temperature difference $\Delta T_R$.

$$L_{RO}\Delta T_R = \frac{\Delta L_R}{\gamma} \tag{3}$$

Similarly, the optical path lengths of the two orthogonally-polarized states of the reflected light from the splitter unit 13 to the interference unit 412 are defined as $L_{MS}$ and $L_{MP}$. A temperature change amount (temperature difference) of the path of the reflected light from a reference temperature is defined as $\Delta T_M$. The reflected light path length at the reference temperature that has been acquired in advance is defined as $L_{MO}$. Then, an optical path-length difference $\Delta L_M$ of the two orthogonally-polarized states is represented by the following Formula (4).

$$\Delta L_M = L_{MS} - L_{MP} = \gamma \Delta T_M L_{MO} \tag{4}$$

Modifying Formula (4) gives Formula (5) representing a correlation between the optical path-length difference $\Delta L_M$ and the temperature difference $\Delta T_M$.

$$L_{MO}\Delta T_M = \frac{\Delta L_M}{Y} \tag{5}$$

Next, the optical path-length difference between the reference light and the reflected light is defined as L. The value of L changes due to the influence of temperature changes of both paths. In view of this, Formulae (3) and (5) above are used to eliminate the terms of temperature. Note that the following formula is a formula in a case where it is assumed that the path of the reference light is longer than the path of the reflected light. In a case where the path of the reflected light is longer than the path of the reference light, a calculation to be performed is $L=L_{MS}-L_{RS}$.

$$\begin{aligned} L &= L_{RS} - L_{MS} \\ &= L_{RO} - L_{MO} + \alpha(L_{RO}\Delta T_R - L_{MO}\Delta T_M) \\ &= L_{RO} - L_{MO} + \frac{\alpha}{\gamma}(L_R - L_M) \end{aligned} \tag{6}$$

Modifying Formula (6) gives the following Formula (7).

$$L_{RO} - L_{MO} = L - \frac{\alpha}{\gamma}(\Delta L_R - \Delta L_M) \tag{7}$$

The left-hand side of Formula (7) represents the difference between the lengths of the optical paths to the target object at the reference temperature. Accordingly, by acquiring in advance the length of each path at the reference temperature, the coefficient of linear expansion α of the polarization maintaining fiber and the temperature coefficient γ of birefringence, distance measurement in which the influence of temperature changes is reduced becomes possible due to the values L, $\Delta L_R$ and $\Delta L_M$ obtained by measurement. At this time, the polarized states of the reflected light and the reference light are caused to be matched.

<Operation>

Figure 4:
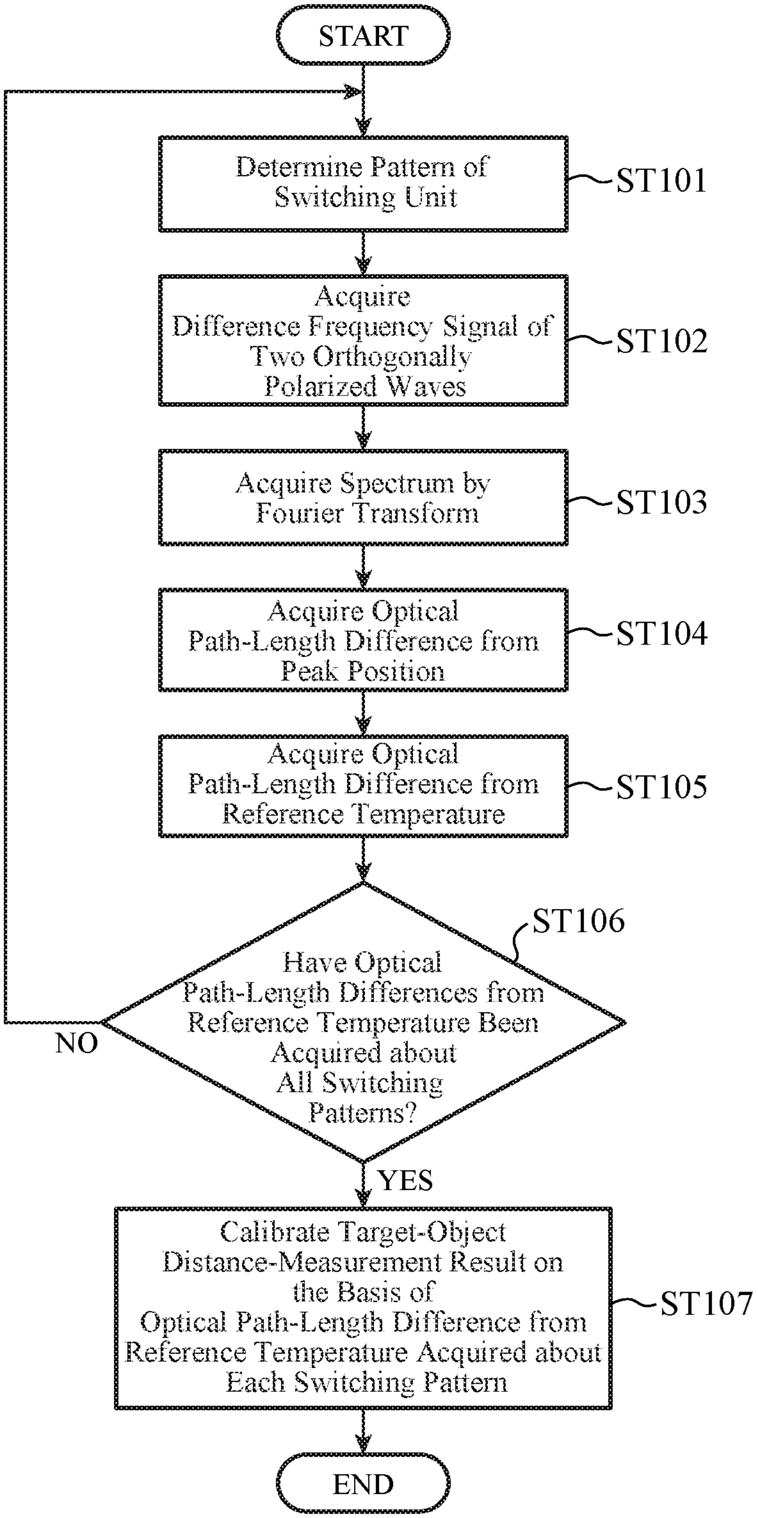
FIG. 4 is a flowchart for explaining operation of the optical measurement device according to the first embodiment.

Next, with reference to FIG. 4, operation of the optical measurement device according to the first embodiment is explained with main focus on operation performed by the calculation processor unit 30. First, at Step ST101, the switch control unit 42 determines a pattern of the switching unit 411 depending on a target path of temperature calibration. Specifically, any one of the pattern of the two orthogonally polarized waves of the reference light, the pattern of the two orthogonally polarized waves of the reflected light and the pattern of the reference light and the reflected light as depicted in FIGS. 3A to 3C is determined as the pattern of the switching unit 411.

Next, at Steps ST102 to ST104, the calculation processor unit 30 obtains the optical path-length difference between two orthogonally polarized lights. Since the difference frequency of the two orthogonally polarized waves is proportional to the optical path length, the optical path-length difference is obtained from a peak position of the spectrum by the Fourier transform.

Specifically, at Step ST102, the calculation processor unit 30 obtains the difference frequency signal of two orthogonally polarized lights as depicted in FIG. 2B.

Next, at Step ST103, the calculation processor unit 30 performs the Fourier transform on the difference frequency signal, and obtains the frequency spectrum.

Next, at Step ST104, the calculation processor unit 30 obtains an optical path-length difference from the frequency spectrum.

Next, at Step ST105, the calculation processor unit 30 acquires an optical path-length difference from the reference temperature. Since the optical path-length difference obtained from the frequency spectrum is temperature-dependent according to Formula (3) or Formula (5), the optical path-length difference from the reference temperature is acquired according to Formula (3) or Formula (5).

Next, at Step ST106, the calculation processor unit 30 decides whether the optical path-length differences from the reference temperature have been acquired about all the switching patterns. In a case where any of the optical path-length differences has not been acquired, the process returns to Step ST101. In a case where the optical path-length differences have been acquired, the process proceeds to Step ST107.

At Step ST107, the calculation processor unit 30 performs measurement of the distance to the target object by obtaining the difference frequency of the reference light and the reflected light obtained about each switching pattern. The obtained value is calibrated by using Formula (3) and Formula (5). This is equivalent to Formula (7).

The ratio of the switching frequency of the three patterns depicted in FIGS. 3A to 3C may be uniform at 1:1:1 or may be not uniform. For example, the ratio of the switching frequency of the three patterns may be not uniform in such a manner that sufficient averaging times can be attained by obtaining the reflected light multiple times as for reflection from a target object whose intensity of the frequency spectrum is unknown. In addition, the ratio may be changed adaptively depending on the intensity of the frequency spectrum by using the switch control unit 42.

In addition, the spectral intensity after wave combination becomes the highest when the ratio is 1:1 for each axis. However, there is a possibility that the spectral intensity fluctuates significantly depending on the polarization ratio in air or on the target-object surface. In view of this, the polarization ratio may be changed adaptively by introducing a polarization controller downstream of the optical circulator 14. Similarly, the splitting ratio at the splitter unit 13 may be changed adaptively depending on the extinction ratio at the target-object surface.

In addition, the polarization intensity of either of the two orthogonally polarized waves should not be zero for measurement. However, there is a possibility that the polarization intensity fluctuates during measurement, due to fiber oscillation or polarization rotation at the target object. Because of this, the polarization intensity ratio at the laser light source 11 may be changed adaptively by giving feedback of a polarization intensity ratio fluctuation obtained at a photoelectric unit.

Second Embodiment

Figure 5:
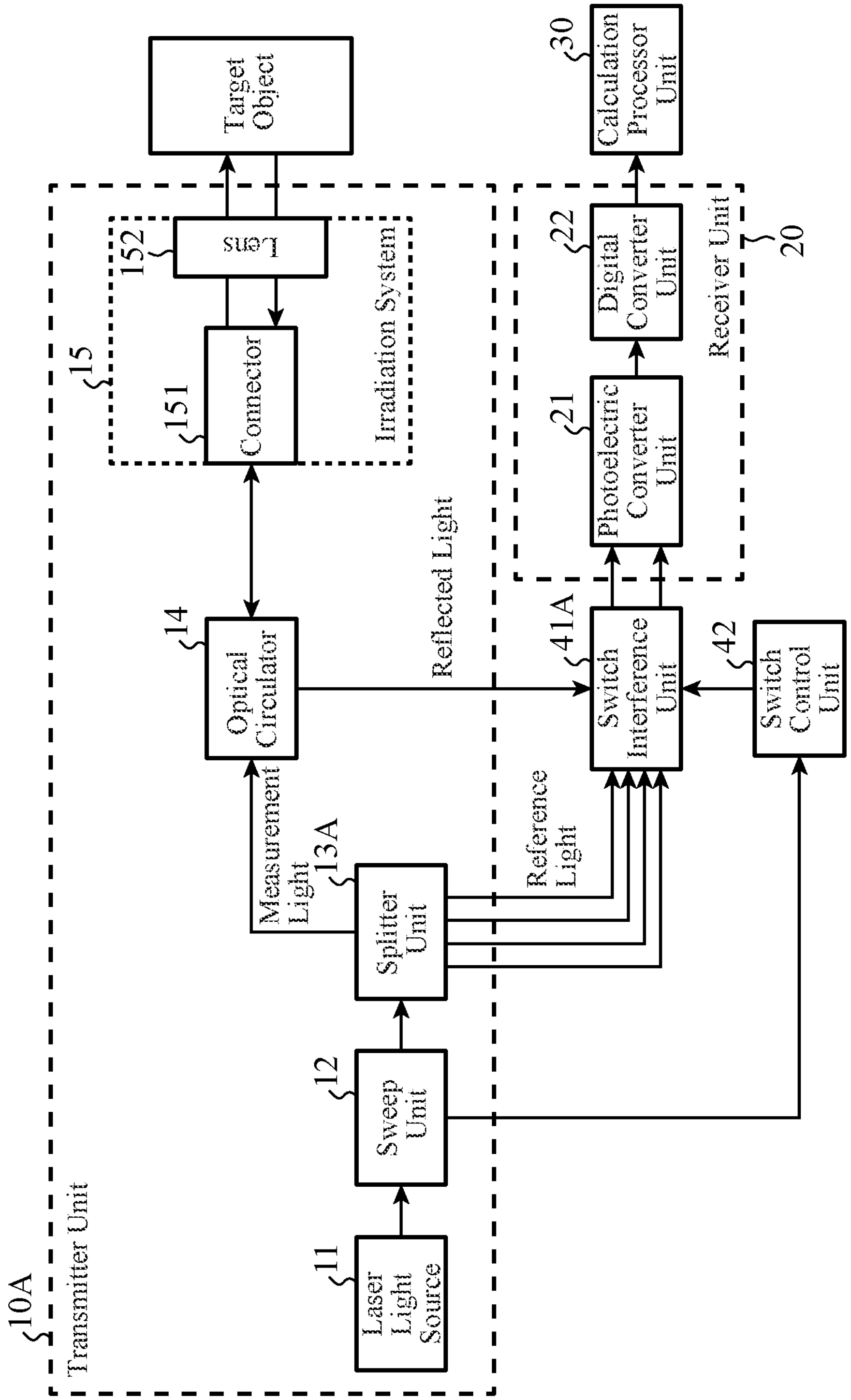
FIG. 5 is a block diagram depicting a configuration example of an optical measurement device according to a second embodiment.
Figure 6:
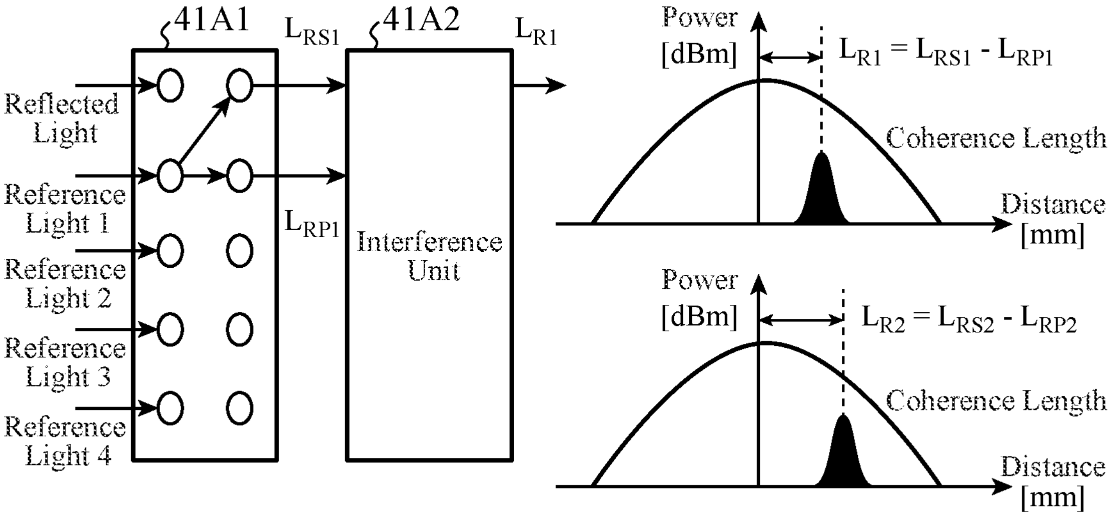
FIG. 6 is a figure for explaining a switching unit and an interference unit of the optical measurement device according to the second embodiment.

With reference to FIGS. 5 and 6, an optical measurement device according to a second embodiment is explained. As depicted in FIG. 5, the optical measurement device according to the second embodiment includes a transmitter unit 10A, a switch interference unit 41A, a switch control unit 42, a receiver unit 20 and a calculation processor unit 30. The transmitter unit 10A includes a laser light source 11, a sweep unit 12, a splitter unit 13A, an optical circulator 14 and an irradiation system 15.

Unlike the case of the first embodiment, the optical measurement device according to the second embodiment includes a plurality of paths (reference light paths) of reference light from the splitter unit 13A to the switch interference unit 41A. The lengths of the plurality of paths of the reference light are mutually different. In a case where there are only two switching paths, in the coherence length, there need to be two reflected lights which are the target of distance measurement. However, by providing the plurality of reference light paths from the splitter unit 13 to the switch interference unit 41A as in FIG. 5, such a necessity can be eliminated. That is, since the reference light can be delayed at multiple steps relative to the reflected light by providing the plurality of paths of the reference light with different lengths, a measurable range can be expanded.

As in FIG. 6, the lengths of the plurality of optical paths of the reference light are defined as $L_{Rk}$ (k is an integer of 1 to 4). The measurement range is specified by the coherence length, and has its center at the point where the optical path lengths of the reference light and the reflected light are the same (see FIG. 2C). Because of this, the measurement range can be expanded by using the plurality of paths of the reference light, and switching the path for measurement at a switching unit 41A1. At this time, each difference is assumed to be sufficiently shorter than the coherence length. By assigning each $L_{Rk}$ in $L_{R1}$ to $L_{R4}$ to Formula (2), measurement in which the influence of a temperature fluctuation is reduced can be implemented even in a case where the plurality of paths of the reference light experience temperature distribution changes, and additionally the measurement range can be substantially expanded, even beyond the range of the coherence length.

Third Embodiment

Figure 7:
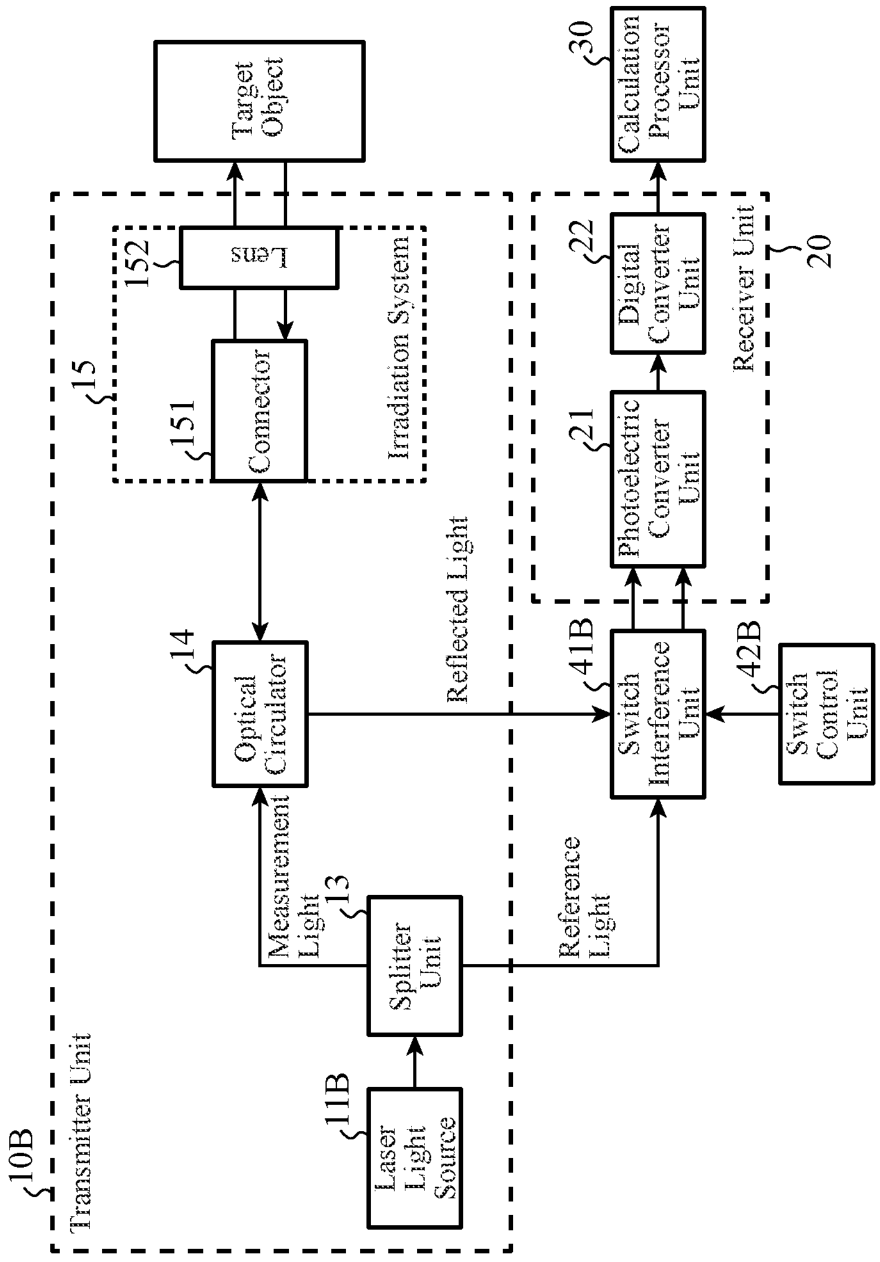
FIG. 7 is a block diagram depicting a configuration example of an optical measurement device according to a third embodiment.

With reference to FIG. 7, an optical measurement device according to a third embodiment is explained. FIG. 7 depicts the optical measurement device using an SD-OCT technology.

As depicted in FIG. 7, the optical measurement device according to the third embodiment includes a transmitter unit 10B, a switch interference unit 41B, a switch control unit 42B, a receiver unit 20 and a calculation processor unit 30. The transmitter unit 10B includes a white light source 11B, a splitter unit 13, an optical circulator 14 and an irradiation system 15. In the optical measurement device according to the third embodiment, the white light source 11B which is a white laser light source is used. Accordingly, in the optical measurement device according to the third embodiment, the sweep unit 12 to perform wavelength sweep used in the first embodiment is unnecessary. Note that since wavelength sweep is not performed in the optical measurement device according to the third embodiment, the switch control unit 42B controls an undepicted switching unit of the switch interference unit 41B on the basis of preset timings.

In this manner, the white light source 11B may be used, instead of performing wavelength sweep. In this case, at the switch interference unit 41B, a device like a diffraction grating in which spectral diffraction is caused depending on wavelengths is provided downstream of the interference unit, and interference light is caused to be transmitted through such a device to obtain transmitted light. Then, the spectral intensity is obtained in an analog-like manner by irradiating a two-dimensional photoelectric converting device (photoelectric converter unit 21) like a CMOS with the transmitted light.

Note that embodiments can be combined, and each embodiment can be modified, omitted, and so on as appropriate.

INDUSTRIAL APPLICABILITY

The optical measurement devices according to the present disclosure can be used as measurement devices to perform measurement of various parts.

REFERENCE SIGNS LIST

10 (10A; 10B): transmitter unit; 11: laser light source; 11B: white light source (white laser light source); 12: sweep unit; 13 (13A): splitter unit; 14: optical circulator; 15: irradiation system; 20: receiver unit; 21: photoelectric converter unit; 22: digital converter unit; 30: calculation processor unit; 41 (41A; 41B): switch interference unit; 41A1: switching unit; 42 (42B): switch control unit; 151: connector; 152: lens; 411: switching unit; 412: interference unit

The invention claimed is:

1. An optical measurement device comprising:

a splitter to split light emitted from a laser light source into measurement light and reference light;

a switch interferometer to output first interference light obtained by causing two orthogonally polarized waves of the reference light to interfere with each other, second interference light obtained by causing two orthogonally polarized waves of reflected light from a target object of the measurement light to interfere with each other, and third interference light obtained by causing the reference light and the reflected light to interfere with each other, with orthogonally polarized states of each interference light separated from each other;

a photoelectric converter to receive each interference light, and convert the received interference light into electric signals;

a digital converter to perform A/D conversion on the electric signals, and output digital signals after the A/D conversion as reception signals; and a calculation processor to convert the reception signals into frequency spectrums, and obtain an optical path-length difference between the two orthogonally polarized waves of the reference light, an optical path-length difference between the two orthogonally polarized waves of the reflected light, and an optical path-length difference between the reference light and the measurement light.

2. The optical measurement device according to claim 1, wherein a path of light from the splitter to the photoelectric converter includes a path including a polarization maintaining fiber.

3. The optical measurement device according to claim 2, wherein a path of the reference light from the splitter to the switch interferometer includes a plurality of reference light paths including polarization maintaining fibers having different lengths.

4. The optical measurement device according to claim 1, further comprising a sweeper to perform wavelength sweep of the laser light source, and output swept light, wherein the splitter splits the swept light into measurement light and reference light.

5. The optical measurement device according to claim 2, further comprising a sweeper to perform wavelength sweep of the laser light source, and output swept light, wherein the splitter splits the swept light into measurement light and reference light.

6. The optical measurement device according to claim 3, further comprising a sweeper to perform wavelength sweep of the laser light source, and output swept light, wherein the splitter splits the swept light into measurement light and reference light.

7. The optical measurement device according to claim 1, wherein the laser light source is a white laser light source.

8. The optical measurement device according to claim 2, wherein the laser light source is a white laser light source.

* * * * *